UNITED STATES PATENT OFFICE.

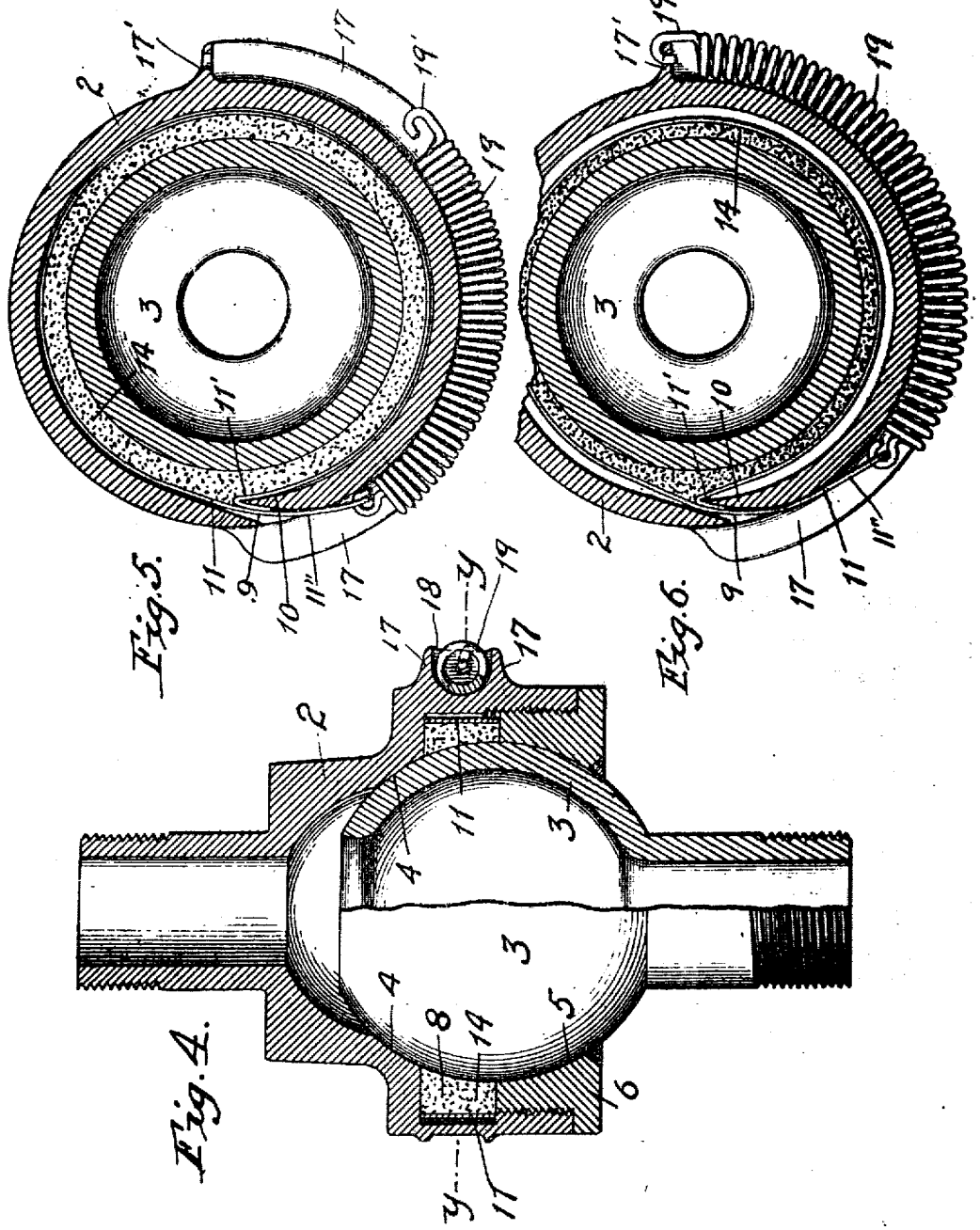

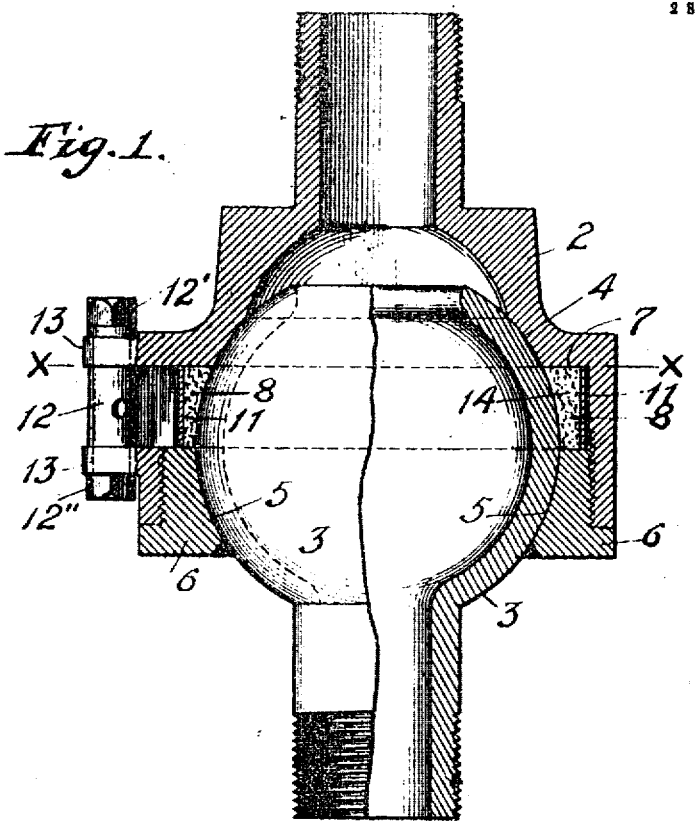
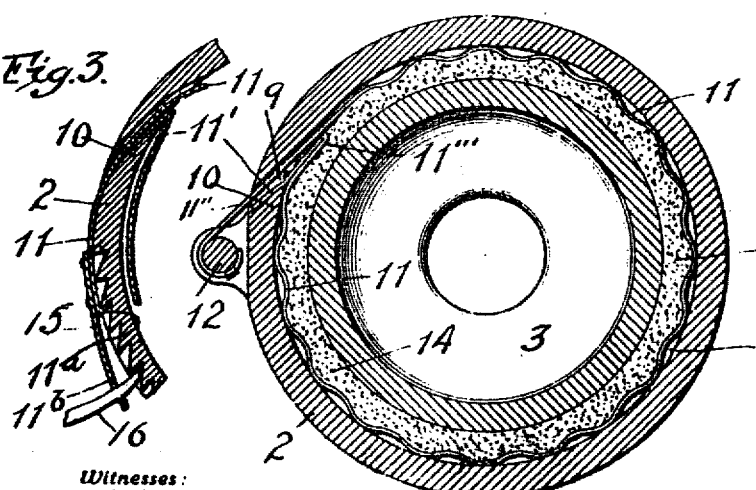

CHARLES GILBERT HAWLEY, OF CHICAGO, ILLINOIS, ASSIGNOR TO THE HOLLAND COMPANY, OF CHICAGO, ILLINOIS, A CORPORATION OF ILLINOIS.

FLEXIBLE FLUID-JOINT.

No. 814,289.

Specification of Letters Patent.

Patented March 6, 1906.

Application filed May 6, 1905. Serial No. 259,192.

*To all whom it may concern:*

Be it known that I, CHARLES GILBERT HAWLEY, a citizen of the United States, residing at Chicago, in the county of Cook and State of Illinois, have invented a certain new, useful, and Improved Flexible Fluid-Joint, of which the following is a full, clear, and exact description, such as will enable others skilled in the art to which it appertains to make and use the same.

My invention relates to flexible joints for fluid pipes or conduits; and the object of the invention is to provide a simple, effective, and durable flexible joint for connecting the ends of various fluid pipes or conduits.

A further object of my invention is to improve the form and construction of ball-joints for fluid-pipes. It is usual to provide joints of this general class with gaskets that are composed of hard non-metallic compounds, such as hard rubber. These gaskets are very expensive; and the particular object of this invention is to provide a flexible joint in which a soft packing may be employed in place of the common gasket-rings.

With this object in view my invention consists, primarily, in a rotary or flexible or ball-and-socket joint the socket member of which is provided with an internal groove to receive suitable packing material, in combination with a suitable, preferably metallic, band or strap arranged in said groove and suitable means for exerting tension upon said band or strap to close or tighten the packing around the contained member of the joint or coupling.

My invention consists, particularly, in a novel ball-and-socket joint comprising a ball member, in combination with a socket member having metallic socket-surfaces between which said ball member is confined, said socket member also having an internal peripheral groove to contain packing material, a metal band arranged within the groove to inclose the packing and press the same against the ball member, and means upon the exterior of said socket member for drawing out the end of said band to tighten said packing; and, further, my invention consists in various details of construction and in combinations of parts, all as hereinafter described, and particularly pointed out on the claims.

The invention will be more readily understood by reference to the accompanying drawings, forming a part of this specification, and in which—

Figure 1 is a longitudinal sectional view of a ball-and-socket joint embodying my invention. Fig. 2 is a transverse sectional view thereof, on the line x x of Fig. 1. Fig. 3 is a transverse sectional detail illustrating a modified form of the strap or band tightening device which I may employ. Fig. 4 is a longitudinal sectional view of my joint or coupling as it appears when provided with a spring-tension device, whereby a constant tension may be exerted upon the packing strap or band. Fig. 5 is a transverse sectional view on the line y y of Fig. 4, showing the band and the tension device in released position; and Fig. 6 is a similar view showing the tension device in operation.

It will be understood from the following description that my invention is capable of adaptation to rotary and flexible joints of many kinds; but it is particularly devised for embodiment in ball-and-socket joints and is thus illustrated in the drawings.

In my invention I provide a socket member 2 and a ball member 3. Both of these members are provided with shanks in the usual manner and are hollow to form a fluid-conduit. The ball member has a finely finished or ground ball-surface, and the socket member is provided with two ground-sockets or socket-surfaces 4 and 5 to fit the ball, the latter being furnished by the plug 6, which is screwed into the outer end of the socket member proper, 2. The socket member is provided with an internal annular shoulder 7, and the plug 6 is of less length than the cylindrical opening or recess within the socket member. In this manner I form an annular or peripheral packing-groove 8 within the socket member and surrounding the ball member between the metal socket-surfaces 4 5. In the side of the socket member I provide a slot or opening 9. This is preferably formed upon a tangent to the internal wall of the socket member, thereby providing a sharp edge or corner 10. Within the packing-groove 8 is a band or strap 11, preferably of the full width of the groove 8. The band 11 is preferably of metal and has one end formed into a hook 11', which is applied to the sharp edge or corner 10. The other end 11" of the strap or band passes out through the hole 9 and is attached to a winding-pin 12 on the exterior of the socket member. This winding-pin may be arranged between lugs 13 and is provided with a polygonal end 12' and a nut 12'', by which it may be secured after it is adjusted. By turning the pin 12 the band may be closed or tightened around the ball to compress the soft packing or other material 14, with which the groove 8 is filled. I prefer that the hooked end 11' of the band shall have a long hook-point 11''' to lap across the hole 9 in the socket member to prevent the loss of the packing through said opening. To render the band automatic in operation, it may be made of spring-steel and corrugated, as shown in Fig. 2, so that when once placed under tension by means of the tension-pin 12 it will thereafter automatically take up the wear or slack of the packing.

In assembling my flexible joint the band is first adjusted within the socket member. The ball is then placed in the socket and the space between the ball and the band is filled with packing. The socket-plug 6 is then screwed home to compress the packing and secure the ball in place, after which the packing is further compressed by contracting the packing-band by means of the tension device 12, as above described.

For some uses of my flexible joint the projecting tension device 12 is ungainly and objectionable, and in such cases I prefer to substitute therefor the take-up or tension device illustrated in Fig. 3. In this instance the side of the socket member 2 is provided with a number of teeth 15, and the free end of the strap or band 11 has a hook 11ᵃ to engage the teeth. The strap is also provided with a tongue 11ᵇ to receive the point of a tool 16, by which the strap may be readily tightened. If desired, a tool-hole may be placed in the strap back of the hook 11ᵃ, in which case the tongue 11ᵇ may be dispensed with.

An automatic take-up or tension device of much merit is illustrated in Figs. 4, 5, and 6 of the drawings. When employing this device, I prefer to provide the socket-member 2 with the partial peripheral flanges 17 17, thereby forming a groove 18 on the side of the socket member. The tension device comprises a spring 19, having its end attached to the free end of the packing band or strap 11. The spring is retained within the groove 18 on the socket member, and its other end 19' is hooked over a lug 17' on the socket member 2. Considerable force is required to place the spring under tension; but this may be readily done in the shop where the joints are manufactured or even when the joints are in use, and when the spring has been secured on the lug 17' it is obvious that it will exert a constant tension upon the packing-band to constantly compress the soft packing against the ball member of the joint.

As it is obvious that numerous modifications of my invention will readily suggest themselves to one skilled in the art, I do not confine the invention to the specific constructions herein shown and described.

Having thus described my invention, I claim as new and desire to secure by Letters Patent—

1. In a flexible joint or coupling of the class described, a socket member having an internal peripheral groove to contain packing, in combination with a band arranged in said groove and means upon said socket member for tightening said band, substantially as described.

2. In a flexible joint of the class described, a ball member in combination with a socket member provided with an internal peripheral groove to contain packing, and a self-tightening band arranged in said groove to press the packing therein against said ball member, substantially as described.

3. In a ball-and-socket joint of the class described, a ball member in combination with a socket member having metallic surfaces to hold said ball member and provided with an internal peripheral groove, a packing-band arranged in said groove, and a band-tightening device upon said socket member, substantially as described.

4. In a joint of the class described, two joint members, one being a socket member to contain the other and provided with an internal peripheral groove to contain packing, a packing band or strap arranged in said groove and having an end extending through the wall of said groove, and band-tightening means upon the exterior of said socket member, substantially as described.

5. In a ball-and-socket joint of the class described, a ball member in combination with a socket member and socket-plug, said member and plug having surfaces fitting said ball, said socket member having a peripheral groove for packing, a packing band or strap arranged in said groove and having its end extending through the side of said socket member, and means upon said socket member for exerting tension upon said band, substantially as described.

6. In a ball-and-socket joint of the class described, a ball member in combination with a socket member provided with an internal packing-groove, a packing-band arranged in said groove, said socket member having a tangential opening in its side through which the end of said band passes, and band-tightening means upon said socket member, substantially as described.

7. In a ball-and-socket joint of the class described, a ball member in combination with a socket member, having an internal groove to receive packing and provided with an opening in its side, a band having one end hooked in said opening and having its other end extending through said opening, and means upon said socket member for tightening said band to close the packing upon said ball member, substantially as described.

8. In a ball-and-socket joint of the class described, a ball member in combination with a socket member having an internal peripheral groove and provided with an opening in its side, a packing-band arranged in said groove with its end extending through said opening, said band having a hooked end which closes said opening, and means upon said socket member for tightening said band, substantially as described.

9. In a ball-and-socket joint of the class described, a ball member in combination with a socket member having an internal packing-groove and provided with a packing-band opening in its side, a packing-band attached to the socket member and having its end extending through the said opening therein, and means arranged upon the side of said socket member and attached to the free end of said band for contracting the band around the packing within said groove, substantially as described.

10. In a ball-and-socket joint of the class described, a ball member in combination with a socket member having suitable ball-surfaces and provided with an internal packing-groove, in combination with a packing-band arranged within said groove and having one of its ends fastened upon the wall of said groove, the other end of said band extending through the side of said socket member, a tension-spring arranged upon said socket member for contracting said band around the packing within said groove, substantially as described.

11. In a ball-and-socket joint of the class described, a ball member in combination with a socket member having an internal packing-groove, a corrugated spring-metal packing-band arranged within said groove and having its end extending through the side of said socket member, and means upon said socket member for exerting tension upon said band, substantially as described.

12. In a ball-and-socket joint of the class described, a ball member in combination with a socket member having an internal packing-groove and provided with an opening in its side, said socket member also having an external groove, a packing-band arranged within the internal groove of said socket member to compress the packing therein, and a spring attached to the free end of said band and occupying the external groove of said socket member, substantially as described.

13. In a ball-and-socket joint of the class described, a ball member in combination with a socket member, a socket-plug arranged in the outer end of said socket member, said socket member and said plug being provided with ball-surfaces, 4, 5, and together forming a packing-groove within the socket member a packing band or strap arranged within said groove, packing in said groove between said ball member and said strap, and means for securing the strap and for exerting tension thereon, substantially as described.

14. In a joint of the class described, a socket member having an integral peripheral groove for packing material and provided with an opening in its side, in combination with a packing-band arranged in said groove, a spring arranged upon the exterior of said socket member and attached to said band to draw the latter around the packing in said groove, and a second joint member journaled within said socket member, substantially as described.

In testimony whereof I have hereunto set my hand, this 4th day of April, 1905, at Chicago, county of Cook, and State of Illinois, in the presence of two subscribing witnesses.

CHARLES GILBERT HAWLEY.

Witnesses:
EDWARD E. SILK,
JOHN R. LEFEVRE.